C. L. & S. P. BACHELLER.
Milk-Cooler.

No. 216,640.   Patented June 17, 1879.

WITNESSES:

INVENTOR:
S. P. Bacheller
C. L. Bacheller
BY Munn & Co
ATTORNEYS.

UNITED STATES PATENT OFFICE.

CHARLES L. BACHELLER AND SANFORD P. BACHELLER, OF CANTON, N. Y.

IMPROVEMENT IN MILK-COOLERS.

Specification forming part of Letters Patent No. 216,640, dated June 17, 1879; application filed March 15, 1879.

*To all whom it may concern:*

Be it known that we, CHARLES LORIN BACHELLER and SANFORD PAUL BACHELLER, of Canton, St. Lawrence county, State of New York, have invented a new and useful Improvement in Milk-Coolers, of which the following is a specification.

Figure 1:
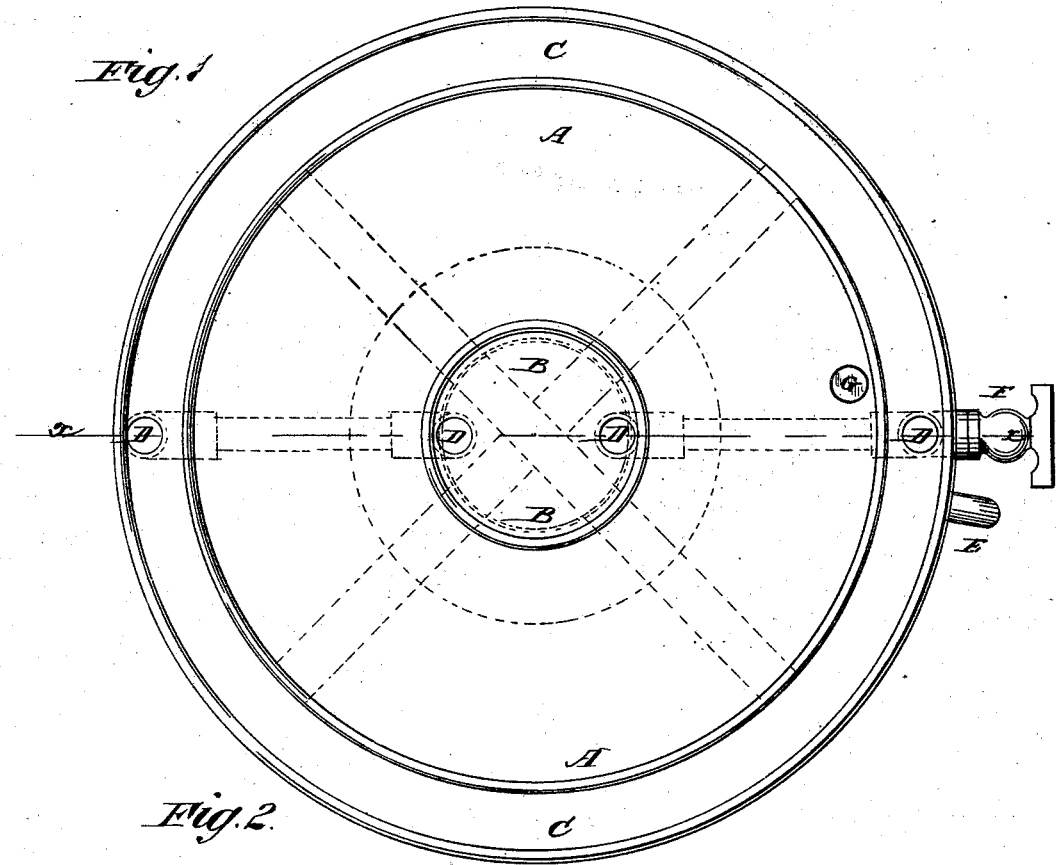
Figure 2:
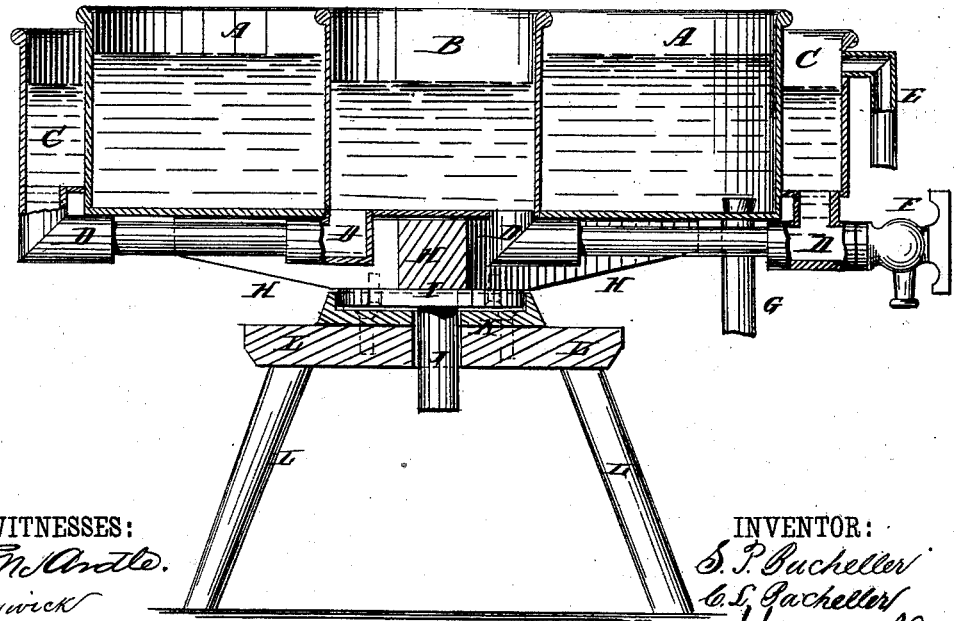

Figure 1 is a top view of our improved milk pan and cooler. Fig. 2 is a vertical cross-section of the same, taken through the line $x\ x$, Fig. 1, a portion only of the pipe D being in section.

Similar letters of reference indicate corresponding parts.

The object of this invention is to furnish an improved milk pan and cooler for use in creameries and other places for holding and cooling milk, which shall be simple in construction and convenient and effective in use, being easily cleaned, and cooling the milk evenly and quickly.

The invention consists in the combination of the three concentric pans provided with the connecting pipe or pipes, the waste-pipe, the water-discharge faucet, and the milk-discharge pipe or faucet, as hereinafter fully described.

A is the milk-pan, in the center of which is a small pan, B. The pan A is surrounded with a third pan, C, so that the cooler consists of three concentric pans.

The outer pan, C, need not extend quite to the bottom of the pan A, or all the pans may be of the same depth, as may be desired.

The pans B C are connected by one or more pipes, D, placed beneath the bottom of the said pans. The inner ends of the pipes D are connected with holes in the bottom of the pan B, and their outer ends are connected with holes in the bottom of the pan C.

E is a waste or overflow pipe, the upper end of which communicates with a hole in the outer wall of the pan C, at a little lower level than the top of the wall of the pan A, so that the water can never overflow into the milk. One of the pipes D is provided with a faucet, F, for convenience in drawing off the water when desired.

Ice may be put in the central pan, B, if desired, or a constant stream of water may be allowed to flow into one or the other of the pans B C.

With a hole in the bottom of the pan A communicates a pipe, G, closed with a plug or faucet for convenience in drawing off the milk when desired. The pan rests upon a support formed of four (more or less) radial bars, H, meeting and secured to each other at the center.

To the lower side of the middle part of the support H is attached a disk, I, having a pivot, J, attached to the center of its lower side, to enter and turn in a hole in the center of a disk or plate, K, attached to the bench or stand L. The lower plate, K, has a flange around its edge to form a seat for the plate I.

With this construction the pan can be easily turned so as to bring every part of it within convenient reach of the operator, so that he can readily skim the milk and clean the pan.

Having thus described our invention, we claim as new and desire to secure by Letters Patent—

The herein-described milk-cooler, consisting of the three concentric pans A B C, provided with the pipes D, communicating with the pans B C, the waste-pipe G, the water-discharge faucet F, and the milk-discharge pipe G, all constructed and arranged substantially as shown and described.

CHARLES LORIN BACHELLER.
SANFORD PAUL BACHELLER.

Witnesses:
L. ALDRICH,
R. C. VOSE,
HORACE SMITH,
H. D. ELLSWORTH.